(12) United States Patent
Axnäs (10) Patent No.: US 8,259,833 B2
(45) Date of Patent: Sep. 4, 2012

(54) METHOD AND ARRANGEMENT RELATING TO RADIO SIGNAL TRANSMISSIONS

(75) Inventor: Johan Axnäs, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 821 days.

(21) Appl. No.: 12/303,886

(22) PCT Filed: Jul. 7, 2006

(86) PCT No.: PCT/SE2006/000867
§ 371 (c)(1),
(2), (4) Date: Feb. 17, 2009

(87) PCT Pub. No.: WO2008/004921
PCT Pub. Date: Jan. 10, 2008

(65) Prior Publication Data
US 2010/0296608 A1    Nov. 25, 2010

(51) Int. Cl.
*H04L 5/12* (2006.01)
(52) U.S. Cl. .................................................. 375/262
(58) Field of Classification Search .............. 375/262, 375/265, 340–341; 714/794, 795
See application file for complete search history.

(56) References Cited

U.S. PATENT DOCUMENTS

| | | | |
|---|---|---|---|
| 6,901,122 B2 * | 5/2005 | Nadgauda et al. | 375/347 |
| 7,236,536 B2 * | 6/2007 | Hochwald et al. | 375/265 |
| 7,505,527 B2 * | 3/2009 | Hwang et al. | 375/267 |
| 7,864,897 B2 * | 1/2011 | Maeda et al. | 375/341 |

FOREIGN PATENT DOCUMENTS

WO    WO03030414 A1    10/2003

OTHER PUBLICATIONS

Marvin K. Simon et al Digital Communication over Fading Channels 2nd Edition http://site.ebray.com/lib/prvbib/Doc?id=10114186& ppg =1 see p. 49, col. 1, line 5-line 28; figure 3.3.

* cited by examiner

*Primary Examiner* — Khanh C Tran (57) ABSTRACT

The present invention aims to provide a method for fast and exact ML low-complexity demodulation in for example MIMO systems. The present invention relates to a method and arrangement for processing signals, especially a Maximum Likelihood (ML) demodulation of Quadrature Amplitude Modulation (QAM) signals, in a digital communications system, having a number of transmit antennas transmitting $n_T$ symbols, the method comprises the steps of: using $x_m$, denoting symbols transmitted, wherein $m=1 \ldots n_T$, given a channel, selecting i and j and making pre-calculations facilitating finding a best combination of $X_1 \ldots X_{i-1}, X_{i+1} \ldots X_{j-1}, X_{j+1} \ldots X_{n_T}$ for any given $X_i, X_j$ and a received signal, going through every combination $X_1 \ldots X_{i-1}, X_{i+1} \ldots X_{j-1}, X_{j+1} \ldots X_{n_T}$ and projecting in a number of directions for each of said combinations and generating a list of candidate combinations of $X_i$ and $X_j$ for each combination $X_1 \ldots X_{i-1}, X_{i+1} \ldots X_{j-1}, X_{j+1} \ldots X_{n_T}$, and hence generating a list of candidate combinations $X_1 \ldots X_{n_T}$, and providing a maximum-likelihood symbol combination.

11 Claims, 6 Drawing Sheets

METHOD AND ARRANGEMENT RELATING TO RADIO SIGNAL TRANSMISSIONS

TECHNICAL FIELD

The present invention relates to a method and arrangement for processing signals, especially a Maximum Likelihood (ML) demodulation of Quadrature Amplitude Modulation (QAM) signals, in a digital communications system.

BACKGROUND OF THE INVENTION

The existing wireless mobile communication systems provide several types of services and mostly depend on channel coding to overcome any inferiority of channels. However, due to the increasing demands, for example for a high-quality multimedia services, in which users can communicate with anyone regardless of time and place, the existing services have evolved data-oriented services. Accordingly, there is a high demand for next generation wireless transmission technology for transmitting the larger amount of data at a lower error rate. In particular, it is very important to transmit data at a high rate in a link in which the amount of required data is large.

For the next generation wireless communication, various antenna systems have been proposed. For example, a MIMO system, i.e., a typical antenna system, increases spectrum efficiency through all of transmission antennas without excessive use of a frequency bandwidth. Generally, MIMO is classified into Space-Time Coding (STC), Diversity, Beam Forming (BF), and Spatial Multiplexing (SM) according to the transmission structure and scheme of a transmitter, all of which provide high data rate and reliability.

A MIMO system adopts multiple antennas or array antenna to transmit/receive data in the transmitter and receiver. Multiple antennas are provided in different spatial positions, with different fading features, thus the received signals of adjacent antennas can be approximated as uncorrelated entirely as long as the spacing between adjacent antennas for transmitting/receiving signals in the MIMO system is large enough. The MIMO system takes full advantage of the spatial characteristics of multipath for implementing space diversity transmission and reception.

FIG. 1 illustrates an exemplary and simplified MIMO system 100 constructed by M Tx antennas 103 and N Rx antennas 104. As mentioned earlier, the antenna spacing between the Tx antennas and Rx antennas in the MIMO system in FIG. 1 is generally big enough, to guarantee the spatial un-correlation of signals. As FIG. 1 shows, in the transmitter, MIMO architecture unit 101 first transforms a channel of data stream into M channels of parallel sub data streams; then, multiple access transform unit 102 performs multiplex processing; finally, the corresponding M Tx antennas 103 transmit the signal simultaneously into the wireless channels. The MIMO architecture unit 101 can adopt any one of the MIMO processing methods, such as STTC (Space Time Trellis Code), space-time block code, space-time Turbo code, BLAST code and etc. While multiple access transform unit 102 can implements TDD, FDD or CDMA. Efficient demodulation of MIMO is non-trivial and currently a hot research topic.

Existing maximum-likelihood detection methods for MIMO are in general highly computationally complex. Much effort has therefore been focused on finding reduced-complexity MIMO demodulation techniques that still give close to optimal performance.

One example of a low-complexity method is Interference Rejection Combing (IRC), which gives good performance at low SNR, but falls well below an optimal demodulator at higher SNRs, closer to the saturation region of the modulation scheme. Other techniques, like sphere decoding (SD), are exact and very fast at high SNR, but extremely complex at low SNRs, at least if configured to give reasonably good performance, since the complexity is then exponential in the problem size, see for example Joakim Jaldén, "On the Complexity of Sphere Decoding in Digital Communications", IEEE Transactions on Signal Processing, April 2005. Also, SD in its basic form generates only hard bits, and soft value generation is complex or relies on ad hoc methods.

Another method, so-called m-algorithm has complexity that is not very dependent on SNR, and shows performance close to an optimal demodulator with substantially lower complexity. However, fairly many retained paths are needed for reaching this performance, making its complexity still rather high. Like the SD, the m-algorithm also relies on ad hoc methods for soft value generation. An approach towards low-complexity exact ML has been proposed in Toshiaki Koike, Daisuke Nishikawa, and Susumu Yoshida, "Metric-segmented Low-complexity ML Detection for Spectrum-efficient Multiple-antenna Systems", VTC 2005 Fall, but also this method only provides hard bits.

EP 1422896 relates to a method of decoding a communications signal in a digital communications system. The communications signal is modulated according to a modulation scheme, such as 16-QAM, including amplitude information. The method comprises the steps of generating a likelihood value for a received communications signal; decoding the communications signal based on at least the generated likelihood value. The method further comprises providing a reliability indication of the amplitude information conveyed by the received communications signal; and generating the likelihood value on the basis of the provided reliability indication of the amplitude information.

SUMMARY OF THE INVENTION

One advantage of the present invention is that it provides a novel method comprising a set of instructions to be applied on a computer, and has low computational complexity while still yielding the exact maximum-likelihood solution and exact LOGMAX soft values for QAM signals.

Preferably, the set of instructions has substantially lower complexity than any other prior art true LOGMAX algorithm for MIMO. The complexity is comparable to or even lower than for many other low-complexity but suboptimal algorithms.

These advantages are achieved by a method for processing signals, especially a Maximum Likelihood (ML) demodulation of Quadrature Amplitude Modulation (QAM) signals, in a digital communications system, having a number of transmit antennas transmitting $n_T$ symbols. The method comprises: using $x_m$, denoting symbols transmitted, wherein $m=1 \ldots n_T$, given a channel, selecting i and j and making pre-calculations facilitating finding a best combination of $x_1 \ldots x_{i-1}, x_{i+1} \ldots x_{j-1}, x_{j+1} \ldots x_{n_T}$ for any given $x_i$, $x_j$ and a received signal, going through every combination $x_1 \ldots x_{i-1}$, $x_{i+1} \ldots x_{j-1}$, $x_{j+1} \ldots x_{n_T}$ and projecting in a number of directions for each of said combinations and generating a list of candidate combinations of $x_i$ and $x_j$ for each combination $x_1 \ldots x_{i-1}, x_{i+1} \ldots x_{j-1}, x_{j+1} \ldots x_{n_T}$, and hence generating a list of candidate combinations $x_1 \ldots x_{n_T}$, and providing a maximum-likelihood symbol combination. The method may further comprise the step of calculating and comparing metrics of the candidate combinations $x_1 \ldots x_{n_T}$. The method may further comprise finding soft values for every bit in $x_1 \ldots x_{n_T-1}$, a best sequence with a bit equal to 0 and a best sequence with a bit equal to 1, both in the list.

Preferably a list of $L^{n_T-2}$ candidate combinations are generated, wherein L is a number of symbols in a symbol alphabet.

The method may reduce computation for computing hard output bits and further comprise the steps of repeating steps for other i and j pairs, for each pair generating a list of candidate combinations $x_1 \ldots x_{n_T}$, selecting candidate combinations that exist in said lists, and calculating and comparing metrics for said selected candidate combinations.

According to a preferred embodiment a method for processing signals is provided, especially a Maximum Likelihood (ML) demodulation of Quadrature Amplitude Modulation (QAM) signals, in a digital communications system transmitting 4 symbols. The method comprises: using $x_1$, $x_2$, $x_3$, $x_4$ denoting symbols transmitted, given a channel, selecting two i and j, wherein i=1 ... 4, j=1 ... 4 and i≠j, and making pre-calculations facilitating finding a best combination of symbols transmitted for any given $x_i$ and $x_j$ and a received signal, going through every combination of symbols transmitted and projecting in a number of directions for each of said combinations and generating a list of candidate combinations of symbols for each combination of transmitted symbols, and hence generating a list of candidate combinations $x_1$, $x_2$, $x_3$, $x_4$, calculating and comparing metrics of the candidate combinations $x_1$, $x_2$, $x_3$, $x_4$, and providing a maximum-likelihood symbol combination.

The invention also relates to an network node arrangement for processing signals, especially a Maximum Likelihood (ML) demodulation of Quadrature Amplitude Modulation (QAM) signals, connectable to a number of antennas transmitting $n_T$ symbols, wherein $x_m$ denotes symbols transmitted, wherein m=1 ... $n_T$. The arrangement comprises: a computation arrangement for making pre-calculations facilitating finding a best combination $x_1 \ldots x_{i-1}, x_{i+1} \ldots x_{j-1}, x_{j+1} \ldots x_{n_T}$ for any given $x_i$, $x_j$ and a received signal, processing means for analyzing every combination $x_1 \ldots x_{i-1}, x_{i+1} \ldots x_{j-1}, x_{j+1} \ldots x_{n_T}$ and making projections in a number of directions for each of said combinations and generating a list of candidate combinations of $x_i$ and $x_j$ for each combination $x_1 \ldots x_{i-1}, x_{i+1} \ldots x_{j-1}, x_{j+1} \ldots x_{n_T}$, and generating a list of candidate combinations $x_1 \ldots x_{n_T}$, storing means for storing said lists and means for calculating and comparing metrics of the candidate combinations $x_1 \ldots x_{n_T}$, an arrangement for providing a maximum-likelihood symbol combination. The network may comprise one of MIMO, MISO or SIMO antenna array.

According to one aspect of the invention a computer program product is provided for processing signals, especially a Maximum Likelihood (ML) demodulation of Quadrature Amplitude Modulation (QAM) signals, having a number of transmit antennas transmitting $n_T$ symbols and $x_m$, denotes symbols transmitted, wherein m=1 ... $n_T$. The product comprises: a set of instructions for executing pre-calculations facilitating finding a best combination of $x_1 \ldots x_{i-1}, x_{i+1} \ldots x_{j-1}, x_{j+1} \ldots x_{n_T}$ for any given $x_i$, $x_j$ and a received signal, a set of instructions for analyzing every combination $x_1 \ldots x_{i-1}, x_{i+1} \ldots x_{j-1}, x_{j+1} \ldots x_{n_T}$ and making projections in a number of directions for each of said combinations and generating a list of candidate combinations of $x_i$ and $x_j$ for each combination $x_1 \ldots x_{i-1}, x_{i+1} \ldots x_{j-1}, x_{j+1} \ldots x_{n_T}$, and generating a list of candidate combinations $x_1 \ldots x_{n_T}$, a set of instructions for calculating and comparing metrics of the candidate combinations $x_1 \ldots x_{n_T}$, and providing a maximum-likelihood symbol combination.

According to one aspect of the invention a user equipment is provided comprising means for processing signals, especially a Maximum Likelihood (ML) demodulation of Quadrature Amplitude Modulation (QAM) signals, connectable to a number of antennas (610) for transmitting nT symbols, wherein $x_m$, denotes symbols transmitted, wherein m=1 ... $n_T$. The means comprises: a computation arrangement for making pre-calculations facilitating finding a best combination of $x_1 \ldots x_{i-1}, x_{i+1} \ldots x_{j-1}, x_{j+1} \ldots x_{n_T}$ for any given $x_i$, $x_j$ and a received signal, processing means for analyzing every combination $x_1 \ldots x_{i-1}, x_{i+1} \ldots x_{j-1}, x_{j+1} \ldots x_{n_T}$ and making projections in a number of directions for each of said combinations and generating a list of candidate combinations of $x_i$ and $x_j$ for each combination $x_1 \ldots x_{i-1}, x_{i+1} \ldots x_{j-1}, x_{j+1} \ldots x_{n_T}$, and generating a list of candidate combinations $x_1 \ldots x_{n_T}$, storing means for storing said lists and means for calculating and comparing metrics of the candidate combinations $x_1 \ldots x_{n_T}$, an arrangement for providing a maximum-likelihood symbol combination.

BRIEF DESCRIPTION OF THE DRAWINGS

In the following, the invention will be exemplified with reference to number of embodiments, as illustrated in the drawings, in which.

DETAILED DESCRIPTION OF PREFERRED EMBODIMENTS

The invention relates to a method for exact ML low-complexity in systems comprising a number of transmit antennas and a number of receive antennas for parallel spatially (independent) transmission and reception, and preferably MIMO systems for demodulation of Quadrature Amplitude Modulation (QAM) signals, with exact LOGMAX soft-value generation, at comparatively low computational complexity.

The method of the invention may in principle be used for any number of antenna branches; however, it is particularly suited for 4×4 MIMO because of good balance between relative complexity reduction and memory requirements. Thus, the invention is described with reference to an example comprising four transmitter and receiver antennas. Other dimensions will also be discussed.

In brief, the method is as follows: Let $x_1$, $x_2$, $x_3$, and $x_4$ denote the transmitted symbols on the four respective transmit antennas, and let the symbol alphabet contain L symbols. Given a channel, it is shown that it is possible to make pre-calculations once for their channel, which enable finding extremely quickly the best (lowest-metric) combination $x_1$ and $x_2$ for any given $x_3$ and $x_4$. This is achieved through a method based on projections in different directions. By going through all $x_3$ and $x_4$ (in total $L^2$ combinations), a list of $L^2$ candidate combinations of $x_1$ and $x_2$ (one for each combination of $x_3$ and $x_4$) can thus be collected at low computational complexity. By calculating and comparing the metrics of these $L^2$ candidate combinations of $x_1$, $x_2$, $x_3$, and $x_4$, the maximum-likelihood symbol combination can be found. Further, since for every bit in $x_3$ and $x_4$, the best sequence with that bit equal to 0 and the best sequence with that bit equal to 1 are both in the list, LOGMAX soft values for each bit in $x_3$ and $x_4$ can easily be found. By re-running the entire procedure with $x_1$ and $x_2$ interchanged with $x_3$ and $x_4$, soft values can be found also for all bits in $x_1$ and $x_2$.

Consequently, in total only in the order of $2L^2$ metrics need to be calculated, which should be compared with $L^4$ metrics for a brute-force method. If only hard bits are required, the method according to the invention can be even further simplified and the number of metrics that need to be computed may further be reduced by orders of magnitude as exemplified in the description.

Usually, a MIMO antenna system with $n_R$ receive and $n_T$ transmit antennas operating in a frequency non-selective channel is described by the following matrix representation:

$$y = Hx + w$$

Wherein y is the $n_R \times 1$ received complex signal vector, H is the $n_R \times n_T$ MIMO channel response, w is the independent and identically distributed elements Additive White Gaussian Noise (AWGN) at the receiver with individual variance of $\sigma_z^2$ and x is the $n_T \times 1$ transmitted complex signal vector with a certain power constraint. For simplicity we assume that $n_T = n_R = M$ in the following description.

Then $$x = \begin{bmatrix} x_1 \\ \vdots \\ x_M \end{bmatrix}, y = \begin{bmatrix} y_1 \\ \vdots \\ y_M \end{bmatrix}, w = \begin{bmatrix} w_1 \\ \vdots \\ w_M \end{bmatrix},$$

where according to this example M=4 is the number of transmit and receive antennas (same number for simplicity). The MIMO maximum-likelihood (ML) demodulation problem for hard bits can then be stated as finding $$\hat{x} = \underset{x \in X^M}{\operatorname{argmin}} \|y - Hx\|^2,$$

where X is the set of all symbols in the symbol alphabet and $X^M$ is the set of all vector symbols. Using Cholesky factorization and a QR decomposition or a second Cholesky factorization, the problem can be transformed into finding $$\hat{x} = \underset{x \in X^M}{\operatorname{argmin}} \|R(x - \tilde{x})'\|^2, \quad (1)$$

where R is an upper-triangular matrix and $\tilde{x}$ is the unconstrained least-squares estimate of x.

It should be appreciated by a person skilled in the art that wide range of MIMO configurations, including those using any linear dispersion code and different number of transmit and receive antennas, can be transformed into the form according to the present invention.

The generation of LOGMAX soft bits will be discussed further below.

By writing $$R = \begin{bmatrix} R_{11} & R_{12} \\ R_{21} & R_{22} \end{bmatrix}, x = \begin{bmatrix} x_1 \\ x_2 \end{bmatrix}, \tilde{x} = \begin{bmatrix} \tilde{x}_1 \\ \tilde{x}_2 \end{bmatrix},$$

where $R_{11}, R_{12}, R_{21}$ and $R_{22}$ are 2×2 matrices ($R_{21}$ all zeros), and where and $x_1, x_2, \tilde{x}_1$ and $\tilde{x}_2$ are 2-element column vectors, $$x_1 = \begin{bmatrix} x_1 \\ x_2 \end{bmatrix}, \tilde{x}_2 = \begin{bmatrix} \tilde{x}_1 \\ \tilde{x}_2 \end{bmatrix},$$

the problem in Equation (1) can be rephrased as $$(\hat{x}_1, \hat{x}_2) = \underset{(x_1, x_2) \in (X^{M/2}, X^{M/2})}{\operatorname{argmin}} \left( \|R_{11}x_1 + \underbrace{R_{12}x_2 - R_{21}\tilde{x}_1 - R_{22}\tilde{x}_2}_{-v}\|^2 + \|R_{22}(x_2 - \tilde{x}_2)\|^2 \right), \quad (2)$$

For a given $x_2$, i.e. a given v as defined in Equation (2), the problem now consists in finding $$\hat{x}_1 = \underset{x_1 \in X}{\operatorname{argmin}} \|R_{11}x_1 - v\|^2.$$

The following is devoted to description of how a function $f_{R_{11}}$ that computes $\hat{x}_1$ from v, i.e.

$$\hat{x}_1 = f_{R_{11}}(v),$$

may be found and evaluated many times with low computational complexity. This approach also enables easy generation of LOGMAX soft decision values, since if the function $f_{R_{11}}(v)$ is evaluated for each v, information about the best bit sequence $(x_1, x_2)$ given that a certain bit in $x_2$ has a certain value (0 or 1) is available and the log-likelihood ratios can be directly calculated.

In the following, the principle of finding $f_{R_{11}}(v)$ for one special case of 16 QAM and a detailed description for a more general case are provided.

The basic principle is first illustrated in the following before turning to the full description.

Figure 1:
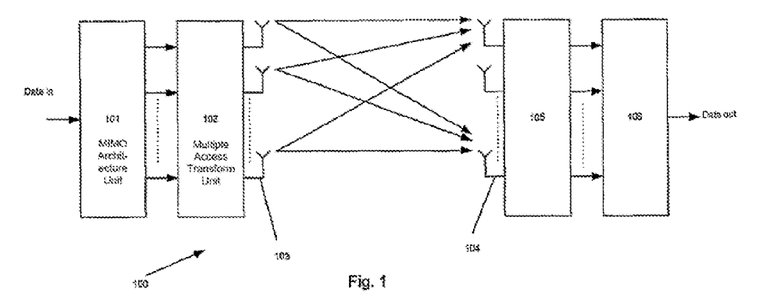
FIG. 1 is a schematic diagram of a MIMO system.
Figure 2:
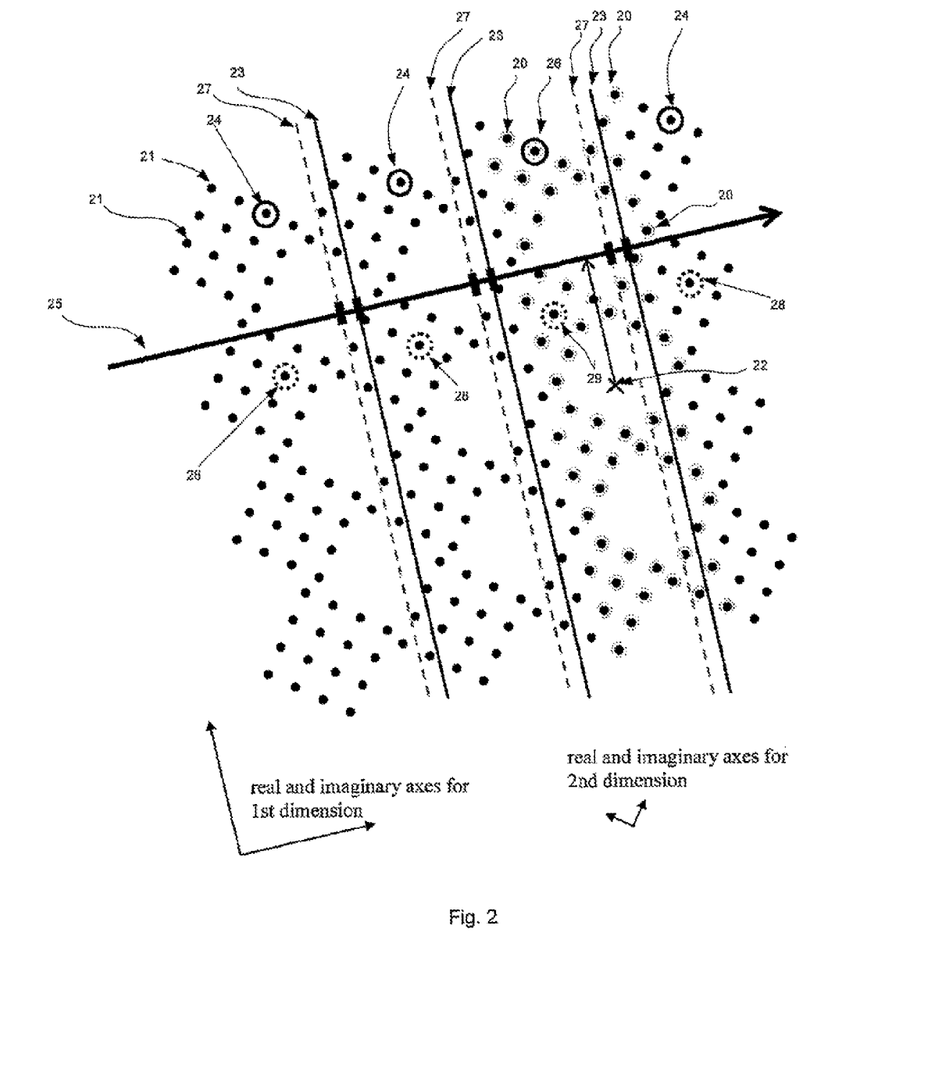
FIG. 2 is a schematic illustration outlining the principle for determining and using a function f according to the invention.

FIG. 2 illustrates method of the invention for the special case of 16 QAM. In FIG. 2, the values of $R_{11}x_1$ for all possible 16×16 values of $x_1$ are illustrated as dots 21. A small cross 22 represents v. In principle, $R_{11}x_1$ and v reside in a four-dimensional space, i.e. two complex numbers, but for simplicity it is assumed that two coordinates are identical for all dots and only the two remaining dimensions need to be illustrated. This simplifying assumption is, however, neither used in the following reasoning, nor in the detailed description following it.

The problem to be solved is finding the dot closest to the cross. In the following, it is described how a large number of dots can easily be ruled out. The solid lines 23 divide the plane into four distinct regions. The lines are chosen to pass exactly halfway between the dots 24 marked with solid large circles.

By projecting the cross 22 onto the solid line 25 transverse to lines 23, it is possible to determine within which region the cross 22 is situated. Given which region, three out of the four dots marked with solid circles can be ruled out as candidates for closest dot. In the illustrated case, all dots with solid circles except the third 26 from the left can be ruled out. Similarly, based on the position of the cross between the dashed lines 27, all dots with dashed circles 28 except the third from the left 29 can be ruled out. In the same way, overall ¾ of all dots can be ruled out, and only 4×16=64 dots remain as candidates. These dots 20 are marked with a narrower circle. Note that although there are 64 dots, they only mark 16 projections on the axis because of their regular structure.

A similar procedure can then be repeated in a perpendicular direction. This will also result in 64 remaining candidate dots, also identified through 16 projections. Furthermore, the intersection of the former 64-dot set and the latter 64 dot-set contains 16 dots, and the dot closest to the cross must belong to this intersection set. The intersection set is completely characterized by the two sets of 16 projections.

Then, the entire procedure may be repeated a second time, but now with lines parallel and perpendicular to the second transmit antenna dimension, cf. FIG. 2. This will also result in a set of 16 candidate dots. The intersection between the former set of 16 dots, and this latter set of 16 dots may in theory contain between 1 and 16 dots. However, simulations with fading channels have shown that it on average is only about 1.2 dots for the considered case of 16 QAM; for 64 QAM it is about 1.5 and for 256 QAM about 1.5-2.

Using a brute force method, this approach would require approximately 3×4×4×4 projections and comparisons for each of the two directions. However, the projections of all dots can be pre-calculated. The pre-calculated table can contain a sorted list of all projections and for each projection a list of the dots that are not ruled out for a cross being projected in the corresponding interval. This would thus require a table of in total 4×4×3 projections (floating point numbers) and 4×4× 3×4×4=768 integers between 0 and 3. A function f can with such pre-calculations be evaluated very quickly. Since f is to be evaluated many times for each channel realization, it turns out that the relative computational complexity from the pre-calculations is rather small.

For determining the function f the following unit vectors may be defined:

$$e_{1r} = \begin{bmatrix} 1 \\ 0 \end{bmatrix}, e_{1i} = \begin{bmatrix} i \\ 0 \end{bmatrix}, e_{2r} = \begin{bmatrix} 0 \\ 1 \end{bmatrix}, e_{2i} = \begin{bmatrix} 0 \\ i \end{bmatrix}$$

where i is an imaginary unit. Also the following is defined $$x_1 = \begin{bmatrix} m_1 + n_1 i \\ m_2 + n_2 i \end{bmatrix} / \gamma,$$

$$x_2 = \begin{bmatrix} m_3 + n_3 i \\ m_4 + n_4 i \end{bmatrix} / \gamma,$$

where $m_j$ and $n_j$ may assume the integer values needed to construct the symbols in the symbols alphabet, e.g. for 16 QAM, $n_j$ may assume the values −3, −1, +1, +3 and γ is a normalization factor that makes the average energy of the symbols in modulation alphabet equal to unity. For notational convenience $m'_j$ and $n'_j$ are further defined, which assume the midpoints between the values assumed by $m_j$ and $n_j$. For example, for 16 QAM, $m'_j$ assumes any of the values −2, 0, 2.

The projection of $R_{11}x_1$ on each of the vectors $k_{1r}$, $k_{1i}$, $k_{2r}$, $k_{2i}$, defined as $$k_{1r} = R_{11}e_{1r}/\|R_{11}e_{1r}\|$$

$$k_{1i} = R_{11}e_{1i}/\|R_{11}e_{1i}\|$$

$$k_{2r} = R_{11}e_{2r}/\|R_{11}e_{2r}\|$$

$$k_{2i} = R_{11}e_{2i}/\|R_{11}e_{2i}\|,$$

is then calculated.

These vectors point in the direction indicated by the antenna real and imaginary axes shown in FIG. 2. In the projection process, the real and imaginary axes should be considered different directions in the vector space. This may be achieved by taking the real part of a projection of the complex conjugate:

$$p_{1r}(m'_1, m_2, n_2) = Re\ \{(R_{11}x_1)^+ k_{1r}\} = Re\ \{x_1^+ R_{11}^+ k_{1r}\}$$

$$p_{1i}(n'_1, m_2, n_2) = Re\ \{x_1^+ R_{11}^+ k_{1i}\}$$

$$p_{2r}(m_1, n_1, m'_2) = Re\ \{x_1^+ R_{11}^+ k_{2r}\}$$

$$p_{2i}(m_1, n_1, n'_2) = Re\ \{x_1^+ R_{11}^+ k_{2i}\}$$

for all $m_j$, $n_j$, $m'_j$, $n'_j$. Note that $p_{1r}$ does not depend on $n'_1$ since $k_{1r}$ is orthogonal to $R_{11} \cdot [n_1 j\ 0]^T$, wherein T denotes vector transpose. Similarly $p_{1i}$, $p_{2r}$, $p_{2i}$ do not depend on $m'_1$, $n'_2$ and $m'_2$, respectively.

Now, for a given vector v, for each combination of $m_2$ and $n_2$ possible $m_1$ are found by projecting v on $k_{1r}$ and comparing this (scalar) value with $p_{1r}(m'_1, m_2, n_2)$ for each $m'_1$. Let $m'_{1,k}$, k=1,2 . . . denote the ordered sequence of all $m'_1$.

If $p_{1r}(m'_{1,k}, m_2, n_2) < vk_{1r} < p_{1r}(m'_{1,k+1}, m_2, n_2)$, then the only possible $m_1$ is $m_1 = \frac{1}{2}(m'_{1,k} + m'_{1,k+1})$.

A function that finds $m_1$ from $m_2$ and $n_2$ may be denoted $g_{1r}$. Hence, the evaluation of the function $g_{1r}$ requires a projection and a number of comparison operations ($\log_2 4$ comparisons for 16 QAM). Similarly, the functions $g_{1i}$, $g_{2r}$, and $g_{2i}$, are defined for calculating $n_1$, $m_2$, and $n_2$, respectively. Altogether, the following is obtained $$m_1 = g_{1r}(m_2, n_2),$$

$$n_1 = g_{1i}(m_2, n_2),$$

$$m_2 = g_{2r}(m_1, n_1),$$

$$n_2 = g_{2i}(m_1, n_1). \quad (3)$$

Evaluating each g function for every possible input argument, a set of L candidates for $m_1$, L candidates for $n_1$, L candidates for $m_2$, and L candidates for $n_2$ are obtained. This set of candidates can be further reduced by requiring all four relations to hold simultaneously. The possible $m_1$ and $n_1$ are thus those that fulfill $$m_1 = g_{1r}(g_{2r}(m_1, n_1), g_{2i}(m_1, n_1))$$

$$n_1 = g_{1i}(g_{2r}(m_1, n_1), g_{2i}(m_1, n_1))$$

for some $m_1$. From these $m_1$ and $n_1$ one may calculate candidate $m_2$ and $n_2$ using Eq. (3). This, results in a small set of candidates, for which the respective metrics are calculated explicitly and the overall best candidate selected.

In the following the aforementioned procedure for computing f is described for computationally efficient execution. Efficient calculation of the functions $g_{1r}$ is considered first. Preferably, every possible $p_{1r}$ (i.e. for 16 QAM 3×4×4 values, one for each combination of $m'_1$, $m_2$, and $n_2$) is pre-calculated and sorted. For each value in this sorted list, a list specifying the only possible $m_1$ for all L combinations of $m_2$ and $n_2$ is pre-calculated. The function $g_{1r}$ can then be evaluated through a projection and a lookup in a table of $(L-1)L^2$ sorted items, which requires $\log_2[(L-1)L^2]$ comparison operations. Similar holds for the other g functions.

Furthermore, the complexity of the projection operation can be greatly reduced by pre-calculating the projections of all terms in v on $k_{1r}$, $k_{1i}$, $k_{2r}$, and $k_{2i}$. For example, the projection on $k_{1r}$ can be re-written as $$\mathrm{Re}\{(-R_{12}x_2)^+ k_{1r}\} = \mathrm{Re}\left\{\left(R_{12}\begin{bmatrix}m_3+n_3 i\\0\end{bmatrix}\right)^+ k_{1r}\right\} + \mathrm{Re}\left\{\left(R_{12}\begin{bmatrix}0\\m_4+n_4 i\end{bmatrix}\right)^+ k_{1r} + (R_{21}\tilde{x}_1)^+ k_{1r} + v\right\}$$

and the L different values of the first term (one for each combination of $m_3$ and $n_3$) and the L different values of the second term pre-calculated. The $L^2$ projections can then be accomplished by just one summation per projection.

The entire computation of f then consists in the following operations:
1. Finding a pointer to the right place in a table where the values of $g_{1r}$, $g_{1i}$, $g_{2r}$, and $g_{2i}$ are listed for all L values of $(m_2, n_2)$ and all L values $(m_1, n_1)$, respectively, requires for a given v only 4×1 additions and approximately 4 $\log_2[L^{(3/2)}]$ comparison operations.
2. Once these table pointers are obtained, the final candidates can be found through 2L comparison-for-equality operations of small integers ($\log_2 L$ bits each).

It is noteworthy that although certain simple integer comparison operations are performed more than $L^2$ times, no operation is carried out in the order of $L^4$ times as in a brute-force method.

Figure 3:
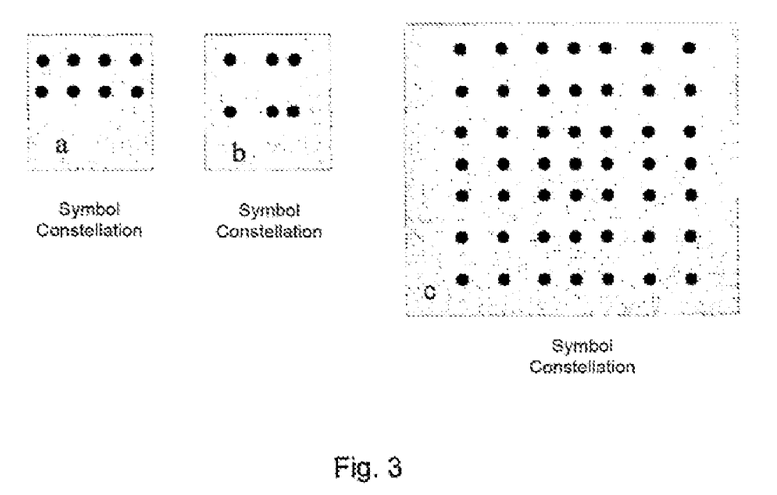
FIGS. 3a-3c are examples of symbol constellations, which can be efficiently handled by the method of the invention.

In the above description, only QAM with fully regular constellations—same spacing between all constellation points, both in real direction and imaginary direction—has been considered. However, the method works equally well for any QAM scheme. Some examples are shown in FIGS. 3a-3c. It should also be noted that different QAM schemes can be used simultaneously on the different antennas.

When only hard output bits are required, the number of metric calculations can be further reduced. When iterating through all combinations of $x_3$, and $x_4$, the metrics need not be calculated for each candidate $x_1$ and $x_2$. Instead, a small list of possible $x_1$ and $x_2$ is retained for each combination of $x_3$, and $x_4$. Similarly, when iterating through all $x_1$ and $x_2$, lists of possible combinations $x_3$, and $x_4$ are retained. The overall most likely symbol combination $x_1$, $x_2$, $x_3$, and $x_4$ must then be in both sets of lists. The symbol combinations that exist in both sets of the list can be found in a manner similar to the one used with the g functions. Explicit metrics, thus only need to be calculated for the symbol combinations that are in both lists, which in practice typically turns out to be rather few (see Table 2 for examples). Since the metric calculations dominate the complexity in the basic form (soft value) of the method, this should lead to a substantial complexity reduction.

The invention may clearly be applied to other dimensions. For 3×3 MIMO, for example, the problem can be split into 2+1 dimensions, instead of 2+2 dimensions for 4×4 MIMO, and for 5×5 MIMO into 2+3 dimensions. Similarly, the method can be used for higher dimensionalities.

Advantageously, the technique of the invention may be used to greatly speed up 2×2 MIMO demodulations in cases where multiple demodulations with the same channel are to be made and only hard bits are needed. The pre-calculations for the function f can then first be made once and subsequently only the table lookup step is needed for each individual demodulation.

The complexity of the proposed method is in Table 2 compared with the complexity of the normal brute-force LOG-MAX algorithm and the m-algorithm. The results for the method of the invention were obtained through simulations and the numbers for the other methods were estimated theoretically.

Figure 4:
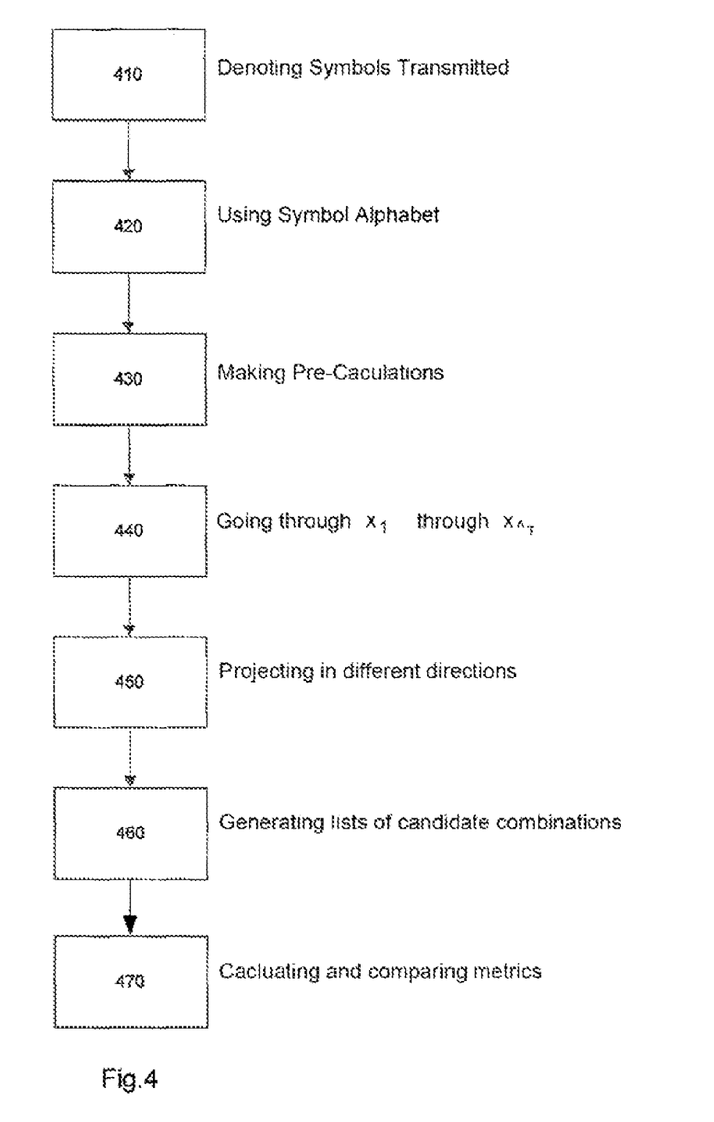
FIG. 4 is a flow diagram illustrating the steps according to the invention.

The aforementioned examples for 4×4 MIMO antennas can be generalized for any number of transmit antennas transmitting nr symbols, as illustrated in the flow diagram of FIG. 4, by: (410) using $x_m$, denoting symbols transmitted, wherein m=1 . . . $n_T$, (420) using a symbol alphabet containing L symbols, (430) given a channel, making pre-calculations enabling finding a best combination of $x_1 \ldots x_{i-1}, x_{i+1} \ldots x_{j-1}, x_{j+1} \ldots x_{n_T}$ for any given $x_i$, $x_j$ and a received signal, (440) going through $x_1 \ldots x_{i-1}, x_{i+1} \ldots x_{j-1}, x_{j+1} \ldots x_{n_T}$ and (450) projecting in different directions for each of them and (460) generating a list of $L^{n_T-2}$ (not limited to) candidate combinations of $x_i$ and $x_j$, and (470) calculating and comparing metrics of $L^{n_T-2}$ candidate combinations of $x_i$ and $x_j$ and providing a maximum-likelihood symbol combination.

The invention may be implemented as a hardware or software solution.

The invention may be implemented in a network node which may comprise a computer unit for processing signals. The network is assumed to have a number of transmit antennas transmitting $n_T$ symbols, and in which $x_m$, denotes symbols transmitted, wherein m=1 . . . $n_T$. A symbol alphabet is assumed to contain L symbols. The computer unit 500, as illustrated schematically in FIG. 5, may comprise a calculation unit 510 for making pre-calculations enabling finding a best combination of $x_1 \ldots x_{i-1}, x_{i+1} \ldots x_{j-1}, x_{j+1} \ldots x_{n_T}$ for any given $x_i$, $x_j$ and a received signal given a channel, a processing unit 520 for processing by going through $x_1 \ldots x_{i-1}, x_{i+1} \ldots x_{j-1}, x_{j+1} \ldots x_{n_T}$ stored in a memory 530 and projecting in different directions for each of them and generating a list of candidate combinations of $x_i$ and $x_j$, (which may be stored in same memory 530 or any other memory) and calculation arrangement 540 for calculating and comparing metrics of candidate combinations of $x_i$ and $x_j$ and outputting means 550 for providing a maximum-likelihood symbol combination. The processing and calculations units may be the same unit.

Figure 6:
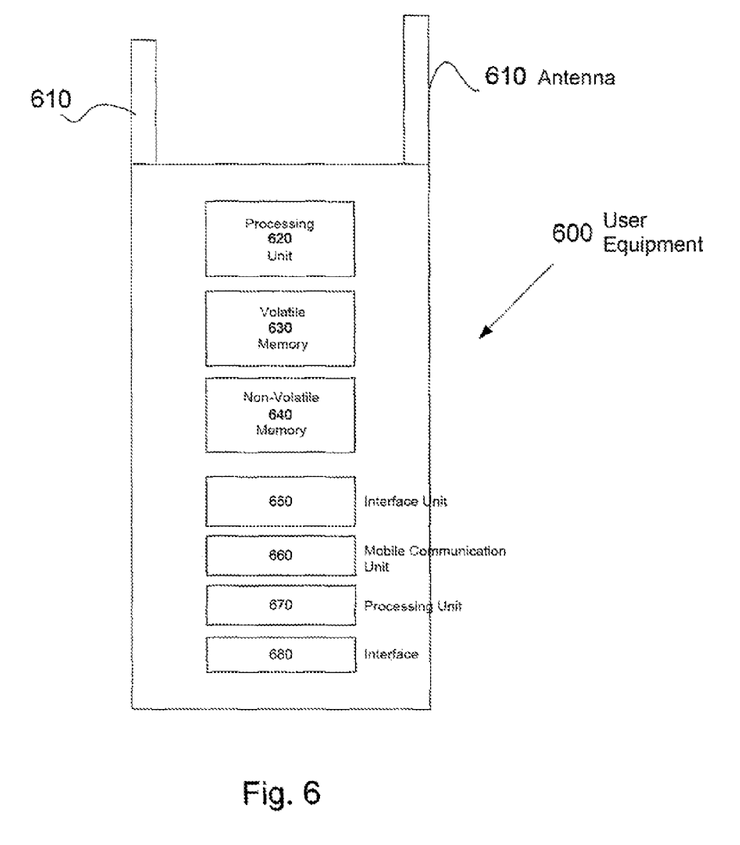
FIG. 6 is a block diagram illustrating a user unit implementing the invention.

FIG. 6 illustrates in a schematic block diagram a user equipment (UE) 600 implementing teachings of the present invention, wherein a processing unit 620 handles communication data and communication control information. The UE 600 further comprises a volatile (e.g. RAM) 630 and/or non volatile memory (e.g. a hard disk or flash disk) 640, an interface unit 650. The UE 600 may further comprise a mobile communication unit 660 with a respective connecting interface. All units in the UE can communicate with each other directly or indirectly through the processing unit 670. Software for implementing the method according to the present invention may be executed within the UE 600. The UE 600 may also comprise an interface 680 for communicating with an identification unit, such as a SIM card, for uniquely identifying the UE in a network and for use in the identification of the 'SIGN' (i.e. traffic counting and digital signature of the UE). Other features often present in UE are not shown in FIG.

6 but should be understood by the person skilled in the art, e.g. for a mobile phone: antennas 610, camera, replaceable memory, screen and buttons.

The invention is not limited to MIMO systems and may be implemented in any multiple transmit/receive systems such as SIMO, MISO etc.

It should be noted that the word "comprising" does not exclude the presence of other elements or steps than those listed and the words "a" or "an" preceding an element do not exclude the presence of a plurality of such elements. The invention can at least in part be implemented in either software or hardware. It should further be noted that any reference signs do not limit the scope of the claims, and that several "means", "devices", and "units" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

TABLE 1

Number of Metric Calculations Required for Different algorithms (all numbers approximate)

|  | 16QAM | 64QAM | 256QAM |
| --- | --- | --- | --- |
| Brute-force ML LOGMAX | 65000 | $1.7 \cdot 10^7$ | $4.3 \cdot 10^9$ |
| m-algorithm, 64 paths kept at each stage* | 1000 | 4000 | 16000 |
| Proposed QAM LOGMAX** | 600 (10***) | 11000 (40***) | $2 \cdot 10^5$ |

*Values indicate number of complete metrics calculated. In addition, several partial metrics that are calculated in intermediate stages of the m-algorithm, but disposed of before the final stage. Note that this number assumes simplified soft value generation.
**Values are average number of calculated metrics, as determined from simulations with independent Rayleigh fading channels. In addition, a number of comparison operations and additions are required (e.g. about 1000 real additions for 16QAM).
***Numbers within parentheses refer to case when only hard output bits are required. (For normal ML LOGMAX and for the m-algorithm with the highly simplified soft value generation scheme considered here, the same number of metrics as in the soft bit case apply also with hard bits only.)

From an implementation point of view not only computational complexity but also memory requirements are important. Because of the pre-calculations, the method requires a certain amount of memory. If implemented in accordance with the description for efficient computation of f above, the method requires for M=4 a memory of $4L^2(\sqrt{L}-1)$ integers ($\log_2 L$ bits each) in main lookup table
$4L^{3/2}$ floating point numbers in main lookup table For 16 QAM, 64 QAM, 256 QAM this corresponds to approximately the memory listed in Table 2.

TABLE 2

Memory Requirements for 4 × 4 MIMO (approximate)

|  | 16QAM | 64QAM | 256QAM |
| --- | --- | --- | --- |
| Integers ($\log_2 L$ bits each) | 3000 | $1 \cdot 10^5$ | $4 \cdot 10^6$ |
| Floating point numbers | 350 | 2000 | 16000 |

This implies that the amount of the memory required is reasonable.

The invention claimed is:

1. A method for processing signals, especially a Maximum Likelihood (ML) demodulation of Quadrature Amplitude Modulation (QAM) signals, in a digital communications system, having a number of transmit antennas transmitting $n_T$ symbols, the method comprising:
   a) using $x_m$, denoting symbols transmitted, wherein $m=1 \ldots n_T$,
   b) given a channel, selecting i and j and making pre-calculations facilitating finding a best combination of $X_1 \ldots X_{i+1}, X_{i+1} \ldots X_{j-1}, X_{j+1} \ldots X_{nT}$ given $X_i, X_j$ and a received signal,
   c) going through every combination $X_1 \ldots X_{i-1}, X_{i+1} \ldots X_{j-1}, X_{j+1} \ldots X_{nT}$ and projecting in a number of directions for each of said combinations and generating a list of candidate combinations of $X_i$ and $X_j$ for each combination $X_1 \ldots X_{i-1}, X_{i+1} \ldots X_{j-1}, X_{j+1} \ldots X_{nT}$, and hence generating a list of candidate combinations $X_1 \ldots X_{nT}$, and
   d) providing a maximum-likelihood symbol combination.

2. The method of claim 1, further comprising the step of calculating and comparing metrics of the candidate combinations $X_1 \ldots X_{nT}$, after said step c.

3. The method of claim 1, further comprising finding soft values for every bit in $X_1 \ldots X_{nt-1}$, a best sequence with a bit equal to 0 and a best sequence with a bit equal to 1, both in the list.

4. The method according to claim 1, wherein a list of $L^{nt-2}$ candidate combinations are generated, wherein, L is a number of symbols in a symbol alphabet.

5. The method of claim 1, for computing hard output bits, further comprising the steps of repeating step c for other i and j pairs, for each pair generating a list of candidate combinations $X_1 \ldots x_{nT}$, selecting candidate combinations that exist in all said lists, and calculating and comparing metrics for said selected candidate combinations.

6. A register in a network node for storing lists according to claim 1.

7. A method for processing signals, especially a Maximum Likelihood (ML) demodulation of Quadrature Amplitude Modulation (QAM) signals, in a digital communications system transmitting 4 symbols, the method comprising:
   a) using $X_1, X_2, X_3, X_4$ denoting symbols transmitted,
   b) given a channel, selecting two i and j wherein i and j assume a number between 1 to 4 and i≠j, and making pre-calculations facilitating finding a best combination of symbols transmitted for any given $x_i$- and $x_j$ and a received signal,
   c) going through every combination of symbols transmitted and projecting in a number of directions for each of said combinations and generating a list of candidate combinations of symbols for each combination of transmitted symbols, and hence generating a list of candidate combinations $X_1, X_2, X_3, X_4$,
   d) calculating and comparing metrics of the candidate combinations $X_1, X_2, X_3, X_4$, and
   e) providing a maximum-likelihood symbol combination.

8. The arrangement of claim 7, the network comprising one of MIMO, MIMO (multiple-input multiple-output), MISO (multiple-input single-output) or SIMO (single-input multiple-output) antenna array.

9. An network node arrangement for processing signals, especially a Maximum Likelihood (ML) demodulation of Quadrature Amplitude Modulation (QAM) signals, connectable to a number of transmit antennas transmitting $n_T$ symbols, wherein $x_m$, denotes symbols transmitted, wherein $m=1 \ldots n_T$, the arrangement comprising:
   a computation arrangement for making pre-calculations facilitating finding a best combination $X_1 \ldots X_{i-1}, X_{i+1} \ldots X_{j-1}, X_{j+1} \ldots X_{nT}$ for any given $X_i, X_j$ and a received signal, processing means for analyzing every combination $X_1 \ldots X_{i-1}, X_{i+1} \ldots X_{j-1}, X_{j+1} \ldots X_{n_T}$ and making projections in a number of directions for each of said combinations and generating a list of candidate combinations of $X_i$ and $X_j$ for each combination $X_1 \ldots X_{i-1}, X_{i+1} \ldots X_{j-1}, X_{j+1} \ldots X_{n_T}$, and generating a list of candidate combinations $X_1 \ldots x_{n_T}$, storing means for storing said lists and means for calculating and comparing metrics of the candidate combinations $X_1 \ldots x_{n_T}$, an arrangement for providing a maximum-likelihood symbol combination.

10. A non-transitory computer readable medium encoded with a computer program product for processing signals, especially a Maximum Likelihood (ML) demodulation of Quadrature Amplitude Modulation (QAM) signals, in a digital communications system, having a number of transmit antennas transmitting $n_T$ symbols and $x_m$, denotes symbols transmitted, wherein m=1 ... nT, the product comprising:

a set of instructions for executing pre-calculations facilitating finding a best combination of $X_1 \ldots X_{i-1}, X_{i+1} \ldots X_{j-1}, X_{j+1} \ldots X_{n_T}$ for any given $X_i$, $X_j$ and a received signal, a set of instructions for analyzing every combination $X_1 \ldots X_{i-1}, X_{i+1} \ldots X_{j-1}, X_{j+1} \ldots X_{n_T}$ and making projections in a number of directions for each of said combinations and generating a list of candidate combinations of x, and $X_j$ for each combination $X_1 \ldots X_{i-1}, X_{i+1} \ldots X_{j-1}, X_{j+1} \ldots X_{n_T}$ and generating a list of candidate combinations $X_1 \ldots X_{nt}$, a set of instructions for calculating and comparing metrics of the candidate combinations $X_1 \ldots x_{n_T}$, and providing a maximum-likelihood symbol combination.

11. A user equipment having an arrangement for processing signals, especially a Maximum Likelihood (ML) demodulation of Quadrature Amplitude Modulation (QAM) signals, connectable to a number of antennas for transmitting $n_T$ symbols, wherein $x_m$, denotes symbols transmitted, wherein m=1 ... $n_T$, the arrangement comprising: a computation arrangement for making pre-calculations facilitating finding a best combination of $X_1 \ldots X_{i-1}, X_{i+1} \ldots X_{j-1}, X_{j+1} \ldots X_{n_T}$ for any given $X_i$, $X_j$ and a received signal, processing means for analyzing every combination $X_1 \ldots X_{i-1}, X_{j+1} \ldots X_{j-1}, X_{j+1} \ldots X_{n_T}$ and making projections in a number of directions for each of said combinations and generating a list of candidate combinations of $X_i$, and $X_j$ for each combination $X_1 \ldots X_{i-1}, X_{i+1} \ldots X_{j-1}, X_{j+1} \ldots X_{n_T}$, and generating a list of candidate combinations $X_1 \ldots X_{n_T}$, storing means for storing said lists and means for calculating and comparing metrics of the candidate combinations $X_1 \ldots x_{n_T}$, an arrangement for providing a maximum-likelihood symbol combination.

* * * * *

UNITED STATES PATENT AND TRADEMARK OFFICE
CERTIFICATE OF CORRECTION

PATENT NO. : 8,259,833 B2
APPLICATION NO. : 12/303886
DATED : September 4, 2012
INVENTOR(S) : Axnas It is certified that error appears in the above-identified patent and that said Letters Patent is hereby corrected as shown below:

In Fig. 4, Sheet 4 of 6, after Box "470" delete "Cacluating" and insert -- Calculating --, therefor.

Figure 5:
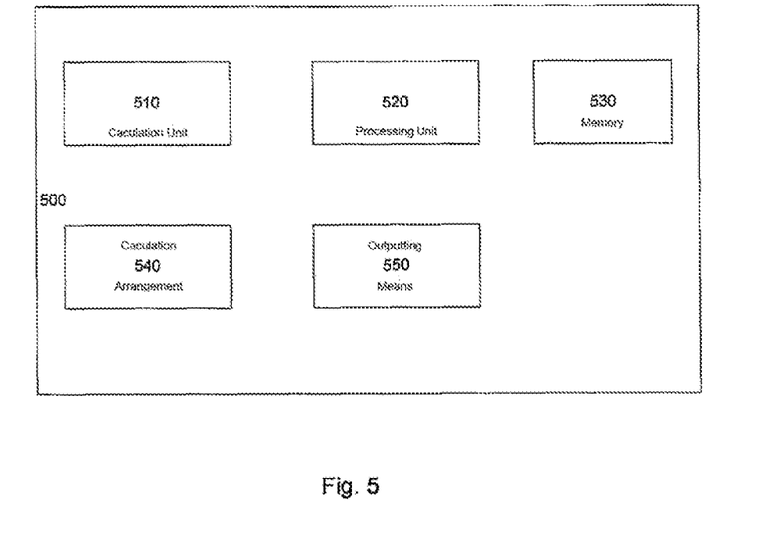
FIG. 5 is a block diagram illustrating an arrangement implementing the invention.

In Fig. 5, Sheet 5 of 6, in Box "510", in Line 1, delete "Caculation Unit" and insert -- Calculation Unit --, therefor.

In Fig. 5, Sheet 5 of 6, in Box "540", in Line 1, delete "Caculation" and insert -- Calculation --, therefor.

In Column 3, Lines 1-3, delete "finding soft........list." and insert the same in Column 2, Line 67 after "comprise" as continuation.

In Column 9, Line 21, delete "$+ y \Big\}$" and insert -- $+ (\mathbf{R}_{22}\tilde{x}_2)^+ \mathbf{k}_v \Big\}$ --, therefor.

In Column 10, Line 18, delete "nr" and insert -- $n_T$ --, therefor.

In Column 11, Line 49, delete "table" and insert -- table. --, therefor.

In Column 12, Line 8, in Claim 1, delete "$X_{i+1}$," and insert -- $X_{i-1}$, --, therefor.

In Column 12, Line 40, in Claim 7, delete "$x_2$," and insert -- $X_2$, --, therefor.

In Column 13, Line 5, in Claim 9, delete "$X_1$" and insert -- $X_i$ --, therefor.

In Column 13, Line 19, in Claim 10, delete "nT," and insert -- $n_T$, --, therefor.

In Column 14, Line 1, in Claim 10, delete "x," and insert -- $X_i$ --, therefor.

Signed and Sealed this
Eleventh Day of December, 2012

David J. Kappos
*Director of the United States Patent and Trademark Office*